(12) United States Patent
Andreev

(10) Patent No.: US 10,353,279 B2
(45) Date of Patent: Jul. 16, 2019

(54) DEVICE FOR IMPROVING HEAT MANAGEMENT DURING THE GENERATION OF AN IMAGE

(71) Applicant: VISTEON GLOBAL TECHNOLOGIES, INC., Van Buren Township, MI (US)

(72) Inventor: Dimitar Andreev, Sofia (BG)

(73) Assignee: Visteon Global Technologies, INC., Van Buren Township, MI (US)

( * ) Notice: Subject to any disclaimer, the term of this patent is extended or adjusted under 35 U.S.C. 154(b) by 0 days.

(21) Appl. No.: 15/141,291

(22) Filed: Apr. 28, 2016

(65) Prior Publication Data

US 2016/0320691 A1    Nov. 3, 2016

(30) Foreign Application Priority Data

Apr. 30, 2015    (DE) .................. 10 2015 106 708

(51) Int. Cl.
| | |
|---|---|
| *G03B 21/16* | (2006.01) |
| *G03B 21/20* | (2006.01) |
| *F21V 29/508* | (2015.01) |
| *F21V 29/505* | (2015.01) |
| *F21V 29/70* | (2015.01) |
| *F21V 29/506* | (2015.01) |
| *F21V 29/50* | (2015.01) |

(52) U.S. Cl.
CPC .............. *G03B 21/16* (2013.01); *F21V 29/50* (2015.01); *F21V 29/505* (2015.01); *F21V 29/506* (2015.01); *F21V 29/508* (2015.01); *F21V 29/70* (2015.01); *G03B 21/208* (2013.01)

(58) Field of Classification Search
CPC ....... G03B 21/16; G03B 21/208; F21V 29/50; F21V 29/505; F21V 29/506; F21V 29/70; F21V 29/508
See application file for complete search history.

(56) References Cited

U.S. PATENT DOCUMENTS

| | | | |
|---|---|---|---|
| 6,905,214 B2 * | 6/2005 | Tani ..................... | G03B 21/208 348/E9.027 |
| 7,057,809 B2 * | 6/2006 | Kubota ................ | G02B 5/0242 353/84 |
| 8,052,308 B2 * | 11/2011 | Kamijima ........... | H01S 5/02296 353/84 |

(Continued)

FOREIGN PATENT DOCUMENTS

EP        1 865 534 A2    12/2007

*Primary Examiner* — Bao-Luan Q Le
(74) *Attorney, Agent, or Firm* — Quinn IP Law

(57) ABSTRACT

A device for the emission of light, in particular for the generation of an image, the device including at least one light source, at least one heat sink, a diffusor for diffusing and homogenizing the light emitted from the light source and comprises a thermal conduction device, is provided herein. The light source is constructed to be thermally coupled to a heat sink. The thermal conduction device is also constructed to be thermally coupled to a heat sink so that heat generated by the light source is transmitted to the thermal conduction device and from the thermal conduction device to the heat sink. The thermal conduction device is additionally constructed as a diffusor for diffusing and homogenizing the light emitted from the light source.

20 Claims, 3 Drawing Sheets

(56) References Cited

U.S. PATENT DOCUMENTS

| | | | | |
|---|---|---|---|---|
| 8,189,123 B2* | 5/2012 | Kuhn | G03B 21/2033 | 348/744 |
| 8,198,573 B2* | 6/2012 | Kamijima | G03B 21/00 | 250/208.1 |
| 8,517,541 B2* | 8/2013 | Kimoto | G03B 21/16 | 353/85 |
| 8,783,937 B2* | 7/2014 | Steedly | F21V 3/049 | 362/249.02 |
| 9,010,966 B2* | 4/2015 | Maeda | F21K 9/50 | 362/249.02 |
| 9,298,031 B2* | 3/2016 | Han | G02F 1/133504 | |
| 9,423,549 B2* | 8/2016 | Toyooka | G02B 5/0205 | |
| 9,437,581 B2* | 9/2016 | Urano | H01L 33/60 | |
| 2004/0057027 A1* | 3/2004 | Tani | G03B 21/208 | 353/102 |
| 2005/0018285 A1* | 1/2005 | Kubota | G02B 5/0242 | 359/443 |
| 2005/0173719 A1* | 8/2005 | Yonekubo | G02B 6/0001 | 257/98 |
| 2007/0041197 A1* | 2/2007 | Saito | G03B 21/16 | 362/296.07 |
| 2007/0064174 A1 | 3/2007 | Kitamura et al. | | |
| 2008/0192153 A1* | 8/2008 | Kuhn | G03B 21/2033 | 348/759 |
| 2011/0042700 A1* | 2/2011 | Lenk | F21V 3/00 | 257/98 |
| 2011/0205733 A1* | 8/2011 | Lenderink | F21V 9/08 | 362/231 |
| 2011/0242496 A1* | 10/2011 | Kimoto | G03B 21/16 | 353/31 |
| 2011/0292346 A1* | 12/2011 | Fok | G03B 21/2066 | 353/13 |
| 2012/0188518 A1* | 7/2012 | Mukouyama | G03B 21/204 | 353/31 |
| 2013/0044478 A1* | 2/2013 | Steedly | F21V 3/049 | 362/235 |
| 2013/0120982 A1 | 5/2013 | Ko et al. | | |
| 2014/0111742 A1* | 4/2014 | Han | G02F 1/133504 | 349/64 |
| 2014/0126213 A1* | 5/2014 | Pattekar | F21V 29/83 | 362/294 |
| 2014/0184996 A1 | 7/2014 | Matsushita et al. | | |
| 2014/0254195 A1* | 9/2014 | Toyooka | G02B 5/0205 | 362/609 |
| 2015/0055340 A1* | 2/2015 | Maeda | F21K 9/50 | 362/235 |
| 2015/0108510 A1* | 4/2015 | Urano | H01L 33/60 | 257/88 |
| 2015/0316233 A1* | 11/2015 | Kawamata | F21V 7/22 | 362/317 |
| 2016/0084455 A1* | 3/2016 | Chen | F21V 25/12 | 362/223 |
| 2016/0131806 A1* | 5/2016 | Koshitouge | H01L 51/5275 | 257/40 |
| 2016/0169500 A1* | 6/2016 | Cai | F21V 3/0445 | 362/294 |
| 2016/0215935 A1* | 7/2016 | Chen | F21V 25/12 | |
| 2016/0320033 A1* | 11/2016 | Emde | F21V 19/042 | |

* cited by examiner

DEVICE FOR IMPROVING HEAT MANAGEMENT DURING THE GENERATION OF AN IMAGE

CROSS-REFERENCE TO RELATED APPLICATION

This patent application claims priority to German Patent Application No. DE 10 2015 106 708 0, filed Apr. 30, 2015, entitled "DEVICE FOR THE EMISSION OF LIGHT, IN PARTICULAR FOR THE GENERATION OF AN IMAGE," the entire disclosure of the application being considered part of the disclosure of this application and hereby incorporated by reference.

BACKGROUND

Known systems from the prior art for the generation of images, also known as "Picture Generating Units" (PGUs) or Image Generating Units" (IGUs), are constructed with light emitting diodes with increasing power and luminous intensity and special lenses, in particular collimator lenses. The construction of the systems for image generation with high-performance light emitting diodes, also called high-performance LEDs, serves to increase the intensity of the display illumination and therefore the brightness of a generated virtual image.

The use of high-performance LEDs can cause a rise in the emission of heat inside the systems, in particular in the area in front of the light-emitting element, that is, especially in the area between the light-emitting element, the collimator lens, and a display device. Due to the increasing emission of heat, the temperature rises in the area in front of the light-emitting element in such a manner that the admissible limit of the working temperature of the display device is exceeded. The display device can fail or be destroyed. The area is also designated as a high-temperature area.

Traditional systems for image generation comprise a heat sink constructed as a cooling body. However, a cooling body thermally coupled to the light-emitting element cannot completely remove the heat emitted from high-performance LEDs, so that the temperature inside the high-temperature area between the collimator lens and the display device sharply rises.

The systems for image generation are also used as components of display devices such as a so-called "head-up-display" and are arranged, for example, in the area of the windshield of a motor vehicle. The term head-up-display, also abbreviated as HUD, denotes a display system in this context with which the user can retain the position of his head and/or the direction of view in the original alignment when observing the displayed information since the information is projected into his field of view. HUDs generally comprise an image-forming unit which generates an image, a lens module and a projection surface. The lens module guides the image onto the projection surface, which is constructed as a reflecting, transparent plate. The vehicle driver sees the reflected information of the image-forming unit and at the same time the actual environment behind the disk.

US 2007/0064174 A1 teaches a device with a light unit and a display unit, in particular a HUD. The light unit comprises illumination elements arranged between a reflector and a heat-blocking layer, through which a liquid crystal panel is illuminated.

EP 1 865 534 B1 discloses a light emission device with a light emission panel and a diffuser plate for diffusing the light emitted by the light emission panel. The device comprises a heat dissipation plate arranged between the light emission panel and the diffuser plate and which is constructed from a material with high thermal conductivity.

Moreover, in addition to the heat blocking layer and heat dissipation plate, ventilators, cooling coils and heat-absorbing filters are used in the prior art.

The systems known from the prior art comprise a plurality of components that are arranged inside the beam of the light emitted by the light-emitting elements and which reduce the intensity of the light exiting from the device. The components provided in the prior art devices can just adequately dissipate the emitted heat. Furthermore, the light emission devices have no connection to a display device which is to be protected from overheating.

There exists a need for a device for the emission of light, in particular to generate an image, in which the heat emitted by light-emitting elements, for example, high-performance LEDs, is more effectively dissipated from a high-temperature area in order to avoid destruction of or damage to the device. Elements for dissipating the heat are to be constructed in combination with a device for generating an image in such a manner that limit temperatures of individual components are not achieved or exceeded. The number of components of the device for the emission of light should be minimal in order to minimize the manufacturing costs. On the other hand the components for removing the heat should be constructed so that the light intensity is not additionally influenced or reduced.

SUMMARY

The aspects disclosed herein include a device for the emission of light, in particular for the generation of an image, comprising at least one light source thermally coupled to a heat sink, and a diffusor comprising a thermally conductive device for diffusing and homogenizing the light emitted by the light source.

The thermal coupling makes possible a thermal transfer between the components that are connected to one another not only by thermal radiation or convection but also by direct thermal conduction. Thermally coupled components are therefore connected in a thermally conductive manner to each other.

The thermally conductive device is designed to be thermally coupled to a heat sink so that emitted heat generated by the light source is transferred to the thermally conductive device and from the thermally conductive device to the heat sink. In addition, the thermally conductive device also functions as a diffusor for diffusing and homogenizing the light emitted by the light source.

A light source or a light unit in this connection is an element that emits heat and light. High-performance LEDs are preferably used as light source.

According to an embodiment, the device comprises a first heat sink and a second heat sink. The light source is constructed to be thermally coupled to the first heat sink. The thermally conductive device is constructed to be thermally coupled to the second heat sink and disposed a distance from the light source so that heat generated by the light source is transmitted to the thermally conductive device and from the thermally conductive device to the second heat sink.

According to an embodiment, the first heat sink and the second heat sink are spatially separated from one another. No direct thermally conductive connection is formed between the heat sinks.

According to another embodiment, the first heat sink and the second heat sink are thermally coupled to one another and are constructed in one piece. Therefore, the thermally conductive device thermally coupled to the second thermally conductive device is also thermally connected via the second heat sink to the first heat sink. The second heat sink is advantageously constructed as a wall of the device.

According to a further embodiment, the thermally conductive device is thermally coupled, at least in sections, to the heat sink. The thermally conductive device may also be completely thermally coupled to the heat sink.

According to an embodiment, the device is constructed with a reflector. The reflector radially surrounds the light source, includes an opening on an end distal to the light source, and is thermally coupled to the heat sink. Therefore, heat emitted by the light source and building up inside the volume surrounded by the reflector is transferred to the heat sink.

According to a further development, the device includes a collimator for aligning the light in parallel, which is arranged in the direction of the light emitted by the light source. In addition, the thermally conductive device may be constructed in a plane aligned perpendicularly to the light directed in parallel by the collimator.

According to an embodiment, the device comprises a display device for generating an image. The thermally conductive device may be disposed in the path of the light emitted by the light source in front of the display device. In other words, the thermally conductive device is located between the light source and the display device so that the light passing the thermally conductive device shines through the display device.

Therefore, this design includes a light source with a display device, such as in a projector unit or a system for image generation, preferably with high-performance LEDs, and a device for the dissipation of heat for the thermal protection of individual components. The projector unit and the system for image generation may be used, for example, as a HUD in motor vehicles, airplanes, ships or the like.

The display device is advantageously constructed as a TFT display.

According to an embodiment, the heat sink is constructed as a cooling body that includes ribs for transferring heat to the ambient air.

According to an embodiment, the thermally conductive device is constructed from a good heat-conducting material such as aluminium, copper, titanium, magnesium or an alloy of one or more that includes such heat-conducting materials. In other words, the thermally conductive device should be conducted of a material having a high thermal conductivity of at least 19 W/(m·K). Other materials having a higher thermal conductivity may be used as well.

The design, especially as regards the small number of components with an effective removal of the heat generated by the light-emitting elements with high luminous power, makes possible the use of the device in combination with optical components for generating a virtual image in a motor vehicle. The virtual image is projected onto the windshield in a direction of view of a vehicle driver when looking in the direction of travel through a windshield. The device and the additional optical components are disposed inside a dashboard.

In sum, the device has advantages, including:
  small number of components,
  minimal costs incurred during the manufacture,
  no reduction of luminous intensity by additional components with an effective removal of the heat generated by the light-emitting elements with high luminous power and therefore protection of a display device against damage due to overheating and the ensuring of a long service life.

BRIEF DESCRIPTION OF THE DRAWINGS

Other details, features and advantages of embodiments of the invention result from the following description of exemplary embodiments with reference made to the associated drawings wherein.

DETAILED DESCRIPTION

Referring to the Figures, wherein like numerals indicate corresponding parts throughout the several views, a device 1 for the emission of light, in particular for the generation of an image is generally shown.

Figure 1:
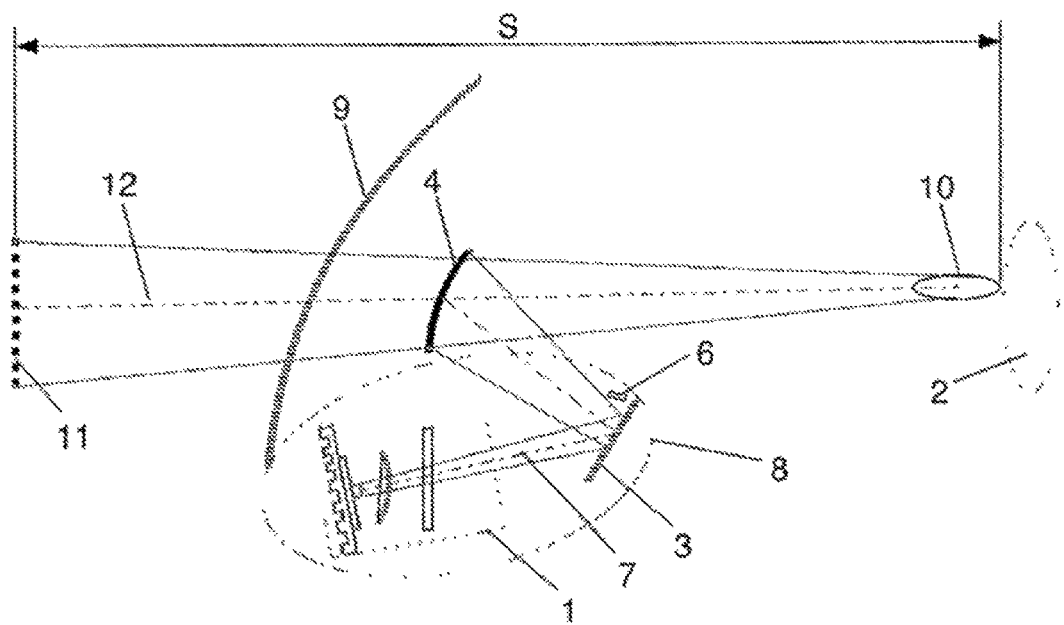
FIG. 1 is a schematic diagram of optical components for a device for the emission of light, in particular for showing information as a virtual image in a motor vehicle.

FIG. 1 shows a device 1 for the emission of light, in particular for generating a virtual image 11 inside an arrangement with optical components for displaying information in a motor vehicle. The virtual image 11 is projected by the windshield 9 in the direction of view of the vehicle driver 2 looking in the direction of travel.

The device 1 with the optical components, in particular a first deflection mirror 3 and a second deflection mirror 4, is arranged inside the dashboard 8. The beam 7 consisting of light rays emitted by the device 1 is conducted via the first deflection mirror 3, which is constructed in a planar or aspherical and convex manner, to the second deflection mirror 4, which is constructed aspherically and concavely. The beam 7 consisting of light rays exits out of the dashboard 8 through a glare light trap (not shown). Another light trap 6 arranged adjacent to the glare light trap prevents in combination with the glare light trap the exit of light rays which can cause irritations of and reflections to the vehicle driver 2.

The beam 7 of light rays is conducted against a predetermined area of the windshield 9 of the motor vehicle, also designated as the projection surface in which the windshield 9 is formed with optical components for displaying the image. The device 1 for the emission of light and for generating the virtual image 11 and the deflection mirrors 3, 4 act in combination with the projection surface formed on the front pane 9 as a HUD.

The vehicle driver 2 is given the possibility of not increasing the area of his head movement and his eye movement 10 in order to perceive the virtual image 11 and the information contained in it. The vehicle driver 2 can retain his head position and his direction of view since the information is projected into his field of vision, which minimizes the deflection of the vehicle driver 2 for receiving the information.

The device 1 generates the virtual image 11, which is conducted onto the reflecting, transparent projection surface of the windshield 9. The vehicle driver 2 sees as a user of the windshield projector the reflected information of the device 1 and at the same time the real environment in the direction of view behind the windshield 9.

The virtual image 11 is displayed at a perceptible distance, the so-called projection distance S, from the vehicle driver 2 on an optical path 12.

Figure 2:
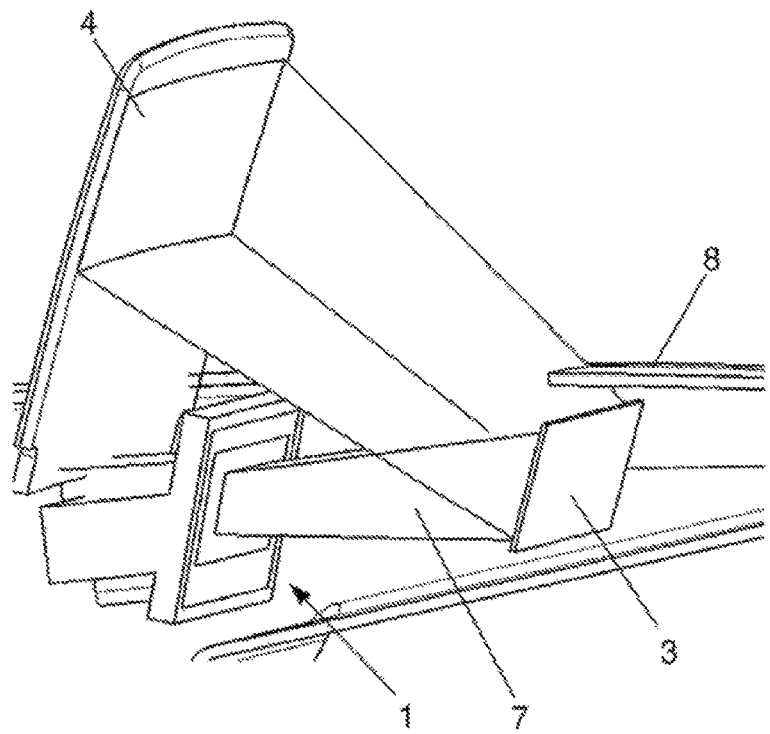
FIG. 2 is a perspective cut-away view of a device for the emission of light, in particular for generating an image, with a first and a second deflection mirror arranged inside a dashboard.

FIG. 2 shows the device 1 for the emission of light, in particular for generating a virtual image 11, in the assembled state in combination with the first deflection mirror 3 and the second deflection mirror 4, which are arranged inside the dashboard 8.

The device 1 transmits the generated beam 7 of light rays in the direction of the vehicle driver 2 onto the first deflection mirror 3, which reflects the light rays onto the second deflection mirror 4.

Figure 3:
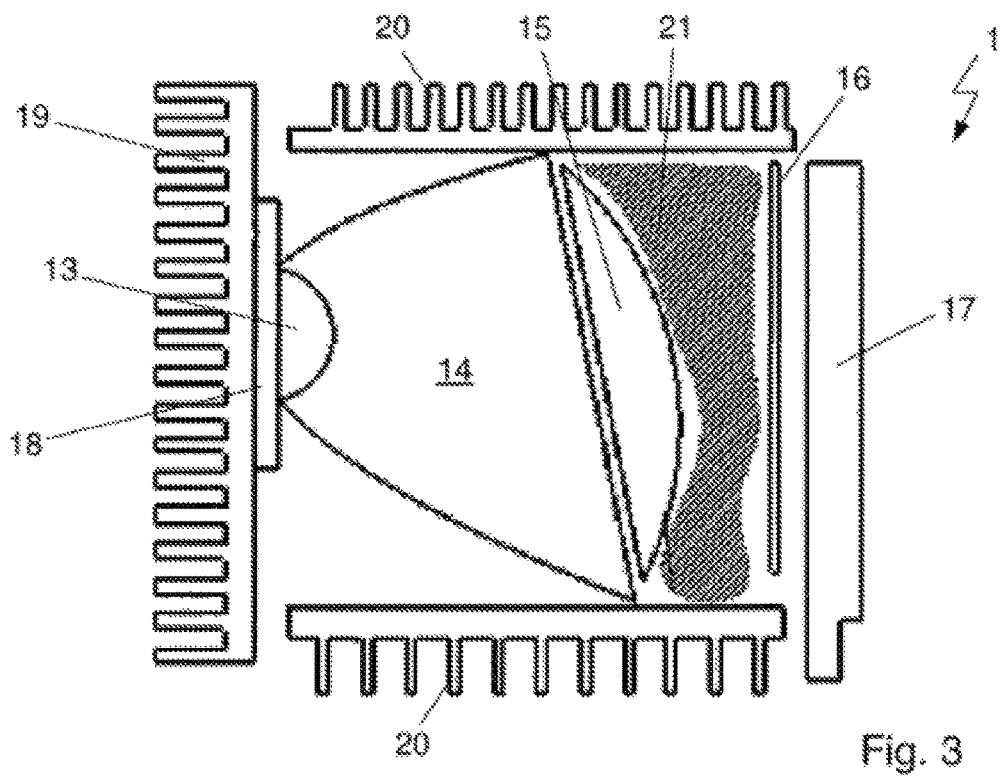
FIG. 3 is a sectional view of a device for the emission of light, in particular for generating an image, showing an area of high temperatures.
Figure 4:
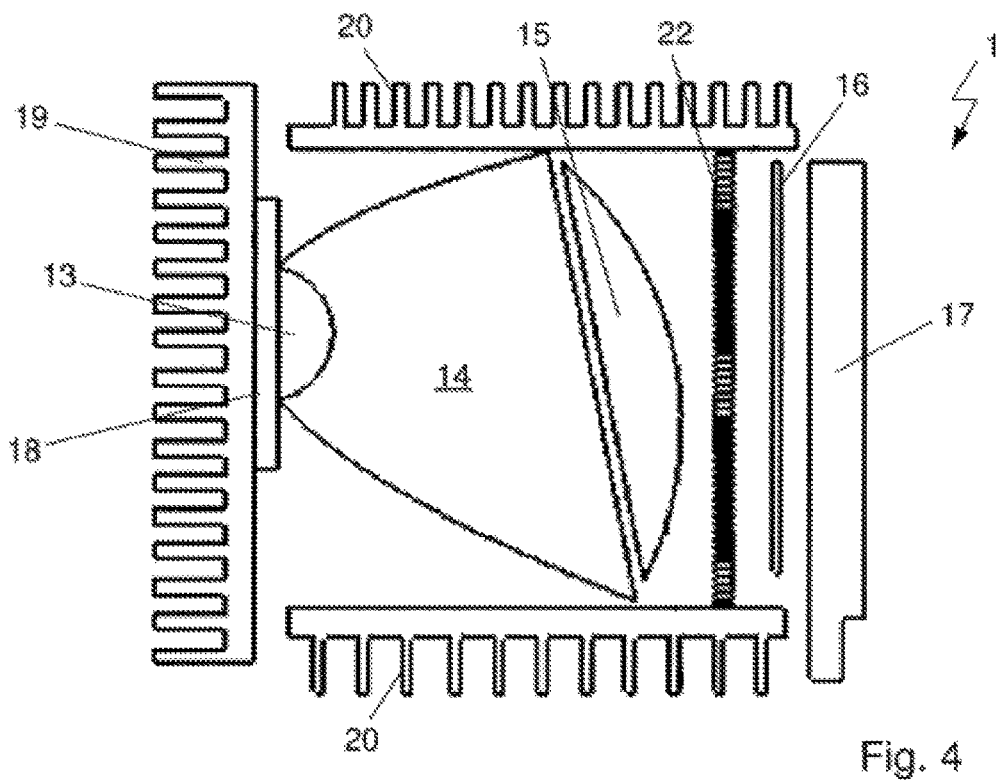
FIG. 4 is a sectional view of a device for the emission of light, in particular for generating an image, with a thermally conductive device disposed in the area of high temperatures.

FIG. 3 shows the device 1 for the emission of light in a sectional view with characterization of an area 21 of high temperatures. FIG. 4 shows the device 1 for the emission of light with a thermally conductive device 22 arranged in the area of high temperatures 21.

The light source 13 is arranged on a circuit board 18 and thermally and mechanically coupled via the circuit board 18 to a first heat sink 19 constructed as a cooling body. The cooling body of the first heat sink 19, which cooling body is constructed on the back side of the light source 13, comprises air-loaded ribs. In particular, a plurality of high-performance light-emitting diodes also designated in the following as high-performance LEDs, serve as light source 13.

The circuit board 18, which can be programmed and is constructed as a power relay, is connected on the one hand to the light source 13 and on the other hand to the heat sink 19 so that heat generated by the light source 13 is transferred via thermal conduction and thermal radiation onto the cooling body. The heat is dissipated from the cooling body to the outside to the air surrounding the device 1.

The light source 13 is surrounded in the area facing away from the circuit board 18 by a reflector 14 which comprises an opening on the end distal to the light source 13. Therefore, the entire light emitted from the light source 13 is conducted to the opening of the reflector 14.

A lens constructed as collimator 15 is arranged on the opening of the reflector 14 for generating a parallel course of the light rays or a parallel beam of light rays. The collimator 15 covers substantially the entire opening of the reflector 14 in order to conduct all light rays emitted from the light source 13 directed in parallel to a display device 17. An optical filter 16 is constructed between the collimator 15 and the display device 17. The display device 17 is, for example, constructed as a high-resolution color TFT display, that is, as a display with a thin-film transistor control or as a thin-film transistor display.

The light rays emitted by the light source 13 and directed in parallel by the collimator 15 shine through the display device 17 in order to generate the virtual image 11.

Since the high-performance LEDs generate and emit light with a very high intensity but, on the other hand, also generate a large amount of heat, the temperature rises inside the device 1, in particular in the area in front of the light source 13. The area of high temperatures 21 extends substantially from the light source 13 and the collimator 15 to the display device 17.

In the area of high temperatures 21 of the device 1 at an ambient temperature of 55° C., temperatures of the collimator 15 and of the filter 16 of approximately 130° C. are achieved and at an ambient temperature of 44° C., approximately 120° C. is achieved. The limit temperature of the collimator 15 is approximately 120° C. The limit temperature of the filter 16 is, in comparison to the above, between 95° C. and 105° C. Therefore, the admissible limits of the working temperatures of the display device 17 and of the filter 16 are exceeded, which can result in destruction and failure of the display device 17 and therefore of the device 1.

As is apparent from FIG. 4, a thermally conductive device 22 is formed in the area of high temperatures 21 which is arranged between the collimator 15 and the display device 17, in particular between the collimator 15 and the filter 16. The thermally conductive device 22 is formed in a plane aligned perpendicular to the light beams directed in parallel by the collimator 15 and extends up to the boundaries of the area of high temperatures 21 and therefore up to the housing of device 1. The housing wall advantageously consists of metal.

The thermally conductive device 22 serves to dissipate the heat rays emitted by the light sources 13 in the direction of the display device 17 and by the filter 16 in order to protect the display device 17 and the filter 16 against too great an incidence of heat and therefore against exceeding the limit temperatures.

The thermally conductive device 22 is coupled thermally and mechanically to a second heat sink 20 constructed as a cooling body so that heat generated by the light source 13 is transferred to the thermally conductive device 22 and from the thermally conductive device 22 substantially via thermal conduction to the heat sink 20. From the cooling body the heat is removed to the outside to the air surrounding the device 1. The cooling body of the second heat sink 19, which body is formed on the side surfaces, in particular on the top and the bottom of the device 1, comprises air-loaded ribs.

In an embodiment which is not shown, the first heat sink 19 and the second heat sink 20 are thermally coupled to one another or constructed in one piece as a heat sink so that the thermally conductive device 22 is also thermally connected via the second heat sink 20 to the first heat sink 19.

The thermally conductive device 22 is constructed on the one hand for dissipating heat to the second heat sink 20 and on the other hand as a diffuser for the light emitted by the light source 13. The diffuser is suitable as a light-scattering element for making hard direct light softer and for reducing strong light-shadow contrasts and disturbing reflexes. In combination with the device 1, the diffuser brings about a uniform illumination of the display device 17.

Figure 5:
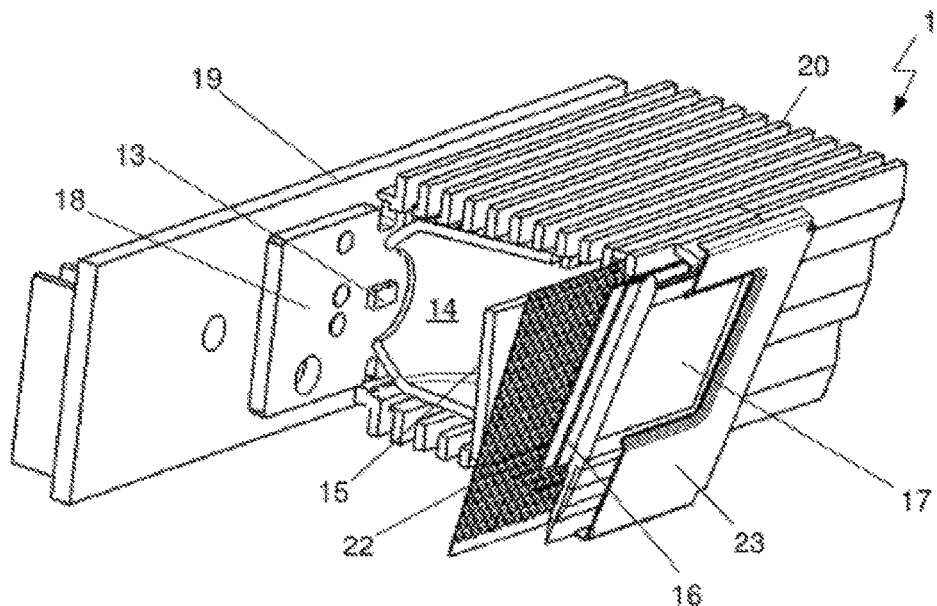
FIG. 5 is a sectional perspective view of a device for the emission of light, in particular for generating an image, with a thermally conductive device.

FIG. 5 shows the device 1 for the emission of light, in particular for generating an image 11, in a sectional perspective view. The circuit board 18 is thermally and mechanically coupled by the first heat sink 19 to the light sources 13 arranged on the front side. The back side of the circuit board 18 facing away from the light source 13 lies flatly on the cooling body of the first heat sink 19. The circuit board 18 is fastened to the cooling body by holding elements which are not shown.

The reflector 14 arranged around the light source 13 lies with a very large part of its entire surface on the cooling body of the second heat sink 20 and is consequently thermally coupled to the cooling body so that the heat emitted by the light sources 13 and building up inside the volume surrounded by the reflector 14 is removed to the outside to the air of the environment.

The thermally conductive device 22 is disposed in the area of high temperatures 21 and aligned perpendicularly to the light rays directed in parallel extends up to the housing of device 1, which housing is constructed on all sides as a cooling body of the second heat sink 20. Therefore, the device 1 is surrounded on its back side by the cooling body of the first heat sink 19 and on all sides and the faces or front side by the cooling body of the second heat sink 19. The cooling body of the second heat sink 20, which cooling body is formed on the side surface and the front side of device 1, comprises air-loaded ribs.

The thermally conductive device 22 is thermally coupled on all edge areas to the cooling body of the second heat sink 20 so that the heat taken up by the thermally conductive device 22 is transferred by thermal conduction to the cooling body and from the cooling body to the air surrounding the device 1.

The light rays emitted by the light source 13 and directed in parallel pass through the collimator (not shown) and the thermally conductive device 22 to the filter 16 and through the display device 17 in order to generate the virtual image 11. The display device 17 is secured by fastening element 23 on the front side of the device 1. In the area of the display device 17 the housing, in particular the cooling body of the second heat sink 20, is designed with an opening through which the light rays emitted by the light source 13 and shining through the display device 17 exit from the device 1.

Figure 6:
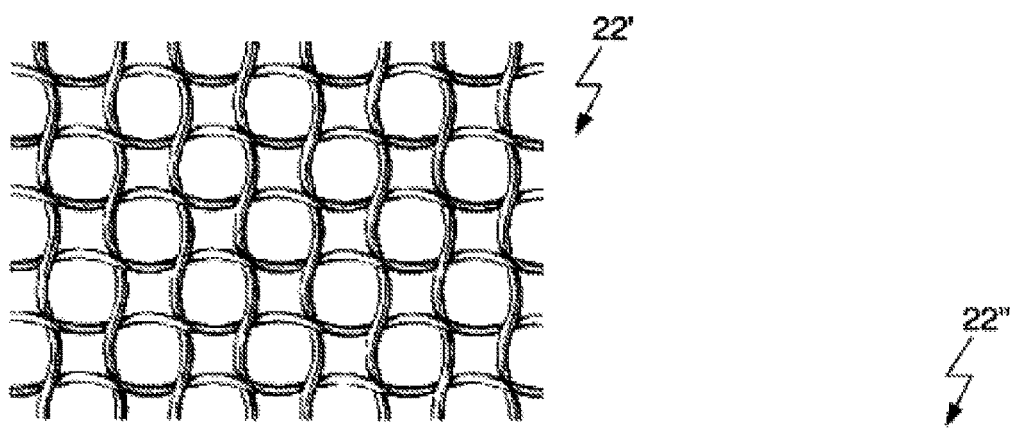
FIG. 6 is a magnified view of one embodiment of a thermally conductive device.
Figure 7:
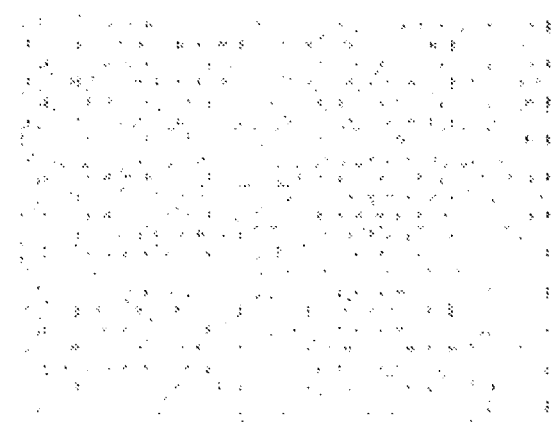
FIG. 7 is a magnified view of another embodiment of a thermally conductive device.

FIGS. 6 and 7 show thermally conductive devices 22', 22" constructed as diffusers in different embodiments.

The thermally conductive devices 22', 22" are constructed as a network, grid or fabric, which may consist of metal. The thermally conductive devices 22', 22" function, in addition to the removal of heat, also as a light diffuser which is permanently connected to a cooling body. The thermally conductive device 22', 22" conducts the heat from a central axis of the beam consisting of light rays to the outside down to the cooling body of the second heat sink 20.

The thermally conductive devices 22', 22" are constructed from a good heat-conducting material, that is, from a material with a high coefficient of thermal conductivity such as aluminium, copper, titanium, or magnesium.

The light rays are substantially perpendicular to the thermally conductive device 22', 22" and pass through the openings formed inside the network, grid or fabric. The light rays are thereby evened-out and conducted further to the display device 17. The thermally conductive devices 22', 22" each have a shape that is homogenizing for the light.

The device 1 can be used in all systems for generating images such as HUD, PGU, IGU, light units, and projector units with high-performance LEDs or other light-emitting elements which also emit heat in addition to light.

What is claimed is:

1. A device for emitting light onto a display for generating an image, the device comprising:
   a first heat sink;
   a light source thermally coupled to the first heat sink, and operable to emit light in a direction of light travel away from the first heat sink;
   a reflector radially encircling the light source and extending away from the light source in the direction of light travel to a distal end forming an opening through which light emitted from the light source travels;
   a second heat sink disposed radially outward and encircling the opening of the reflector relative to light exiting the opening of the reflector in the direction of light travel, wherein the second heat sink extends beyond the opening of the reflector in the direction of light travel;
   a thermally conductive device generally disposed perpendicular to the direction of light travel and forward of the opening of the reflector, wherein the thermally conductive device is thermally coupled to the second heat sink, and extends radially outward beyond the opening of the reflector to contact the second heat sink; and
   wherein the thermally conductive device includes a thermally conductive material arranged in a grid pattern, and is operable to diffuse light emitted from the light source.

2. The device according to claim 1,
   wherein the second heat sink is spaced apart from the light source, and
   wherein the thermally conductive device is thermally coupled to the second heat sink so that heat generated by the light source is transmitted to the thermally conductive device and from the thermally conductive device to the second heat sink.

3. The device according to claim 2, wherein the second heat sink is constructed as a wall of the device.

4. The device according to claim 3, wherein the thermal conductive device is mechanically attached to the second heat sink.

5. The device according to claim 3, further comprising a fastener, the fastener being attached to a display surface of the device and the second heat sink.

6. The device according to claim 1, wherein the thermally conductive device is arranged in the direction of the light emitted by the light source in front of a display surface of the device so that the light passing the thermally conductive device shines through the display surface of the device.

7. The device set forth in claim 6, further comprising an optical filter disposed between the thermally conductive device and the display surface of the device.

8. The device according to claim 1, wherein the thermally conductive device includes at least one section thermally coupled to the first heat sink.

9. The device according to claim 1, wherein the reflector is thermally coupled to at least one of the first heat sink or the second heat sink so that heat absorbed by the reflector is transferred to at least one of the first heat sink or the second heat sink.

10. The device according to claim 1, further including a collimator for aligning the light emitted by the light source in parallel, and
    wherein the thermally conductive device is disposed in a plane aligned perpendicularly to the light aligned in parallel by the collimator.

11. The device according to claim 1, wherein the first heat sink is a cooling body with ribs for transmitting heat to the surrounding air.

12. The device according to claim 1, wherein the thermally conductive device consists of a material having a thermal conductivity of at least 19 W/(m·K).

13. The device according to claim 1, further including optical components for generating a virtual image in a motor vehicle having a dashboard,
    wherein the virtual image is projected onto the windshield in a direction of view of a vehicle driver when looking in the direction of travel through a windshield, and the device and the optical components are arranged inside the dashboard of the motor vehicle.

14. The device according to claim 1, wherein the thermally conductive device is aluminium.

15. The device according to claim 1, wherein the thermally conductive device is copper.

16. The device according to claim 1, wherein the thermally conductive device is titanium.

17. The device according to claim 1, wherein the thermally conductive device is magnesium.

18. The device according to claim 1, wherein the thermally conductive device is fabric.

19. The device set forth in claim 1, further comprising a circuit board disposed between and interconnecting the light source and the first heat sink, with the first heat sink disposed on a first face of the circuit board and the light source disposed on an opposing second face of the circuit board for emitting light along the direction of light travel away from the circuit board.

20. A system for generating an image in a vehicle, the system comprising:
- a circuit board having a first face and an opposing second face;
- a first heat sink attached to the first face of the circuit board;
- a light source attached to the second face of the circuit board, with the circuit board thermally coupling the first heat sink and the light source, wherein the light source is operable to emit light in a direction of light travel away from the second face of the circuit board;
- a reflector radially encircling the light source and extending away from the light source in the direction of light travel to a distal end forming an opening in the reflector through which light emitted from the light source travels;
- a collimator extending across the opening of the reflector and operable to align light emitted from the light source in parallel with the direction of light travel;
- a second heat sink disposed radially outward and encircling the opening of the reflector relative to light exiting the opening of the reflector in the direction of light travel, wherein the second heat sink extends beyond the opening of the reflector in the direction of light travel;
- a thermally conductive device generally disposed perpendicular to the direction of light travel and forward of the opening of the reflector and the collimator, wherein the thermally conductive device is thermally coupled to the second heat sink, and extends radially outward beyond the opening of the reflector to contact the second heat sink;
- wherein the thermally conductive device includes a thermally conductive material arranged in a grid pattern, and is operable to diffuse light emitted from the light source;
- a display device having a display surface positioned to receive light from the light source for generating an image;
- an optical filter disposed between the thermally conductive device and the display surface; and
- wherein the thermally conductive device is operable to absorb heat from the light emitted from the light source and transmit the absorbed heat to the second heat sink to lower an air temperature around the optical filter and the display surface.

\* \* \* \* \*